(12) United States Patent
McKinney

(10) Patent No.: US 8,103,178 B2
(45) Date of Patent: Jan. 24, 2012

(54) LINEARIZED PHASE MODULATED ANALOG OPTICAL LINKS

(75) Inventor: Jason D. McKinney, Waldorf, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 427 days.

(21) Appl. No.: 12/425,595

(22) Filed: Apr. 17, 2009

(65) Prior Publication Data

US 2009/0263144 A1    Oct. 22, 2009

Related U.S. Application Data

(60) Provisional application No. 61/046,127, filed on Apr. 18, 2008.

(51) Int. Cl.
  *H04B 10/06* (2006.01)
  *H04B 10/00* (2006.01)
(52) U.S. Cl. ......... 398/211; 398/202; 398/212; 398/214
(58) Field of Classification Search .......... 398/182–201; 725/129
  See application file for complete search history.

(56) References Cited

U.S. PATENT DOCUMENTS

| | | | |
|---|---|---|---|
| 6,201,632 B1 | 3/2001 | Rollins | |
| 6,211,996 B1 | 4/2001 | Fuse | |
| 6,266,173 B1 * | 7/2001 | Hayes | ............ 398/212 |
| 6,452,714 B1 | 9/2002 | Rollins | |
| 6,476,957 B1 | 11/2002 | Ward et al. | |
| 6,487,004 B1 | 11/2002 | Strutz et al. | |
| 6,519,375 B1 | 2/2003 | Rollins et al. | |
| 6,587,257 B1 | 7/2003 | Davies | |
| 6,671,298 B1 | 12/2003 | Delfyett et al. | |
| 6,697,576 B1 | 2/2004 | Rollins et al. | |
| 6,720,549 B1 | 4/2004 | Herve et al. | |
| 7,079,780 B1 | 7/2006 | Rollins | |
| 7,369,715 B2 | 5/2008 | Darcie et al. | |
| 2004/0136730 A1* | 7/2004 | Fuse et al. | ........ 398/188 |
| 2007/0019282 A1 | 1/2007 | Weiner et al. | |
| 2007/0025737 A1 | 2/2007 | Kamio et al. | |

(Continued)

OTHER PUBLICATIONS

Ackerman, E.I., "Linearization of a Broadband Analog Optical Link Using Multiple Wavelengths", MWP'98, IEEE International Topical Meeting on Microwave Photonics, MC5, pp. 45-48, Oct. 1998.

(Continued)

*Primary Examiner* — Kenneth N Vanderpuye
*Assistant Examiner* — Daniel Dobson
(74) *Attorney, Agent, or Firm* — Amy L. Ressing; Sally A. Ferrett

(57) ABSTRACT

A phase-modulated analog optical link that uses parallel interferometric demodulation to mitigate the dominant intermodulation distortion present in the link. A receiver for demodulating phase modulated optical signals includes a splitter dividing the phase modulated signal into parallel optical paths, each optical path having an asymmetrical interferometer, the time delays of the interferometers being unequal, and each optical path includes a photodiode optically connected to an output of the interferometer. Outputs of the photodiodes enter a hybrid coupler. Alternatively, outputs of the interferometer enter a balanced photodetector. A phase shifter or time delay element can be included in one optical path to ensure inputs to the coupler or balanced photodetector have the correct phase. The input power to the parallel optical paths is split in a ratio that balances the third-order distortion in the output photocurrent.

22 Claims, 11 Drawing Sheets

U.S. PATENT DOCUMENTS

| | | | |
|---|---|---|---|
| 2007/0041735 | A1 | 2/2007 | Darcie et al. |
| 2009/0051582 | A1 | 2/2009 | Williams et al. |
| 2009/0074421 | A1* | 3/2009 | Thaniyavarn ............ 398/116 |

OTHER PUBLICATIONS

Ackerman, E.I., Burns, W.K., Betts, G.E., Chen, J.X., Prince, J.L., Regan, M.D., Roussell, H.V., Cox, C.H., "RF-Over-Fiber Links with Very Low Noise Figure", J. Lightwave Tech., vol. 26, No. 15, pp. 2441-2448, Aug. 2008.

Ackerman, E.I., "Broad-band linearization of a mach-zehnder electrooptic modulator," IEEE Trans. Microwave Theory Tech., vol. 47, No. 12, pp. 2271-2279, Dec. 1999.

Bucholtz, F., Urick, V.J., Rogge, M.S., and Williams, K.J., "Performance of analog photonic links employing phase modulation," in Coherent Optical Technologies and Applications, Technical Digest (CD), paper CFAG, pp. 1-3, Optical Society of America, 2006.

Chen, D., Fetterman, H.R., Chen, A., Steier, W.H., Dalton, L.R., Wang, W., Shi, Y., "Demonstration of 110 GHz electro-optic polymer modulators." Appl Phys. Lett., vol. 70(25), pp. 3335-3337, Jun. 1997.

Chou, H.-F., Ramaswamy, A., Zibar, D., Johansson, L.A., Bowers, J.E., Rodwell, M., Coldren, L., SFDR Improvement of a Coherent Receiver Using Feedback, Optical Amplifiers and Their Applications/Coherent Optical Technologies and Applications, Technical Digest (CD)(Optical Society of America, 2006), paper CFA3, Jun. 2006, pp. 1-3.

Clark, T.R. and Dennis, M.L., "Coherent Optical Phase-Modulation Link", IEEE Photonics Technology Letters, vol. 19, No. 16, pp. 1206-1208, Aug. 15, 2007.

Devgan, P., Urick, V., McKinney, J., Williams, K., "Hybrid Analog-Digital Fiber Optic Network for Aircraft Communication and Control", Avionics, Fiber-Optics and Photonics Technology Conference, 2007 IEEE, Oct. 2-5, 2007, pp. 17-18.

Devgan, P.S., Urick, V.J., McKinney, J.D., Williams, K.J., "Cascaded Noise Penalty for Amplified Long-Haul Analog Fiber-Optic Links", Microwave Theory and Techniques, IEEE Transactions on, vol. 55, Iss. 9, Sep. 2007, pp. 1973-1977.

Dolfi, D., Mongardien, D., Tonda, S., Schaller, M., and Chazelas, J., "Photonics for airborne phased array radars," in IEEE International Conference on Phased Away Systems and Technology, pp. 379-382, May 22-25, 2000.

Farwell, M.L,, Lin, Z.-Q., Wooten, E., and Chang, W.S.C. "An electrooptic intensity modulator with improved linearity," IEEE Photon. Technol. Lett., vol. 3, No. 9, pp. 792-795, Sep. 1991.

Haas B.M. and Murphy, T.E., "A Simple, Linearized Phase-Modulated Analog Optical Transmission System", IEEE Photon. Technol. Lett., vol. 19, No. 10, pp. 729-731, May 15, 2007.

Haas, B.M. and Murphy, T. E., "Suppression of intermodulation distortion in phase-modulated analog photonic links," in MWP 2006, International Topical Meeting on Microwave Photonics, Oct. 2006.

Johansson, L.A. and Seeds, A.J., "36-GHz 140-Mb/s radio-over-fiber transmission using an optical injection phase-lock loop source," IEEE Photon. Technol. Lett., vol. 13, No. 8, pp. 893-895, Aug. 2001.

Johnson, L.M. and Roussell, H. V., "Reduction of intermodulation distortion in interferometric optical modulators," Opt. Lett., vol. 13, pp. 928-930, 1988.

Johnson, L.M. and Roussell, H.V., "Reduction of Intermodulation Distortion in Interferometric Optical Modulators", Laser and Electro-Optical Society Conference, 1988, Paper OE7.6, pp. 119-120.

Kolner, B.H. and Dolfi, D.W., "Intermodulation distortion and compression in an integrated electrooptic modulator," Appl. Opt., vol. 26, pp. 3676-3680, Sep. 1987.

McKinney, J.D., Godinez, M., Urick, V.J., Thaniyavarn, S., Charczenko, W., and Williams, K.J., "Sub-10 db noise figure in a multiple-GHz analog optical link", IEEE Photon. Technol. Lett., vol. 19, No. 7, pp. 456-457, Apr. 1, 2007.

McKinney, J.D. and Williams, K.J., "A Linearized Phase-Modulated Analog Optical Link", Lasers and Electro-Optics, 2008 and 2008 Conference on Quantum Electronics and Laser Science. CLEO/QELS 2008, pp. 1-2, May 4-9, 2008.

Pan, Z., Chandel, S., "Ultrahigh-speed optical pulse generation using a phase modulator and two stages of delayed Mach-Zehnder interferometers", Opt. Engr., vol. 46, No. 7, Jul. 2007, pp. 075001-1-075001-3.

Seeds, A.J., "Microwave photonics," IEEE Trans. Microwave Theory Tech., vol. 50, No. 3, pp. 877-887, Mar. 2002.

Urick, V.J., Hastings, A., Dexter, J.L., Williams, K.J., "Field Test on the Feasibility of Remoting HF Antenna with Fiber Optics", NRL/MR/5652-089137, Jul. 31, 2008, pp. 1-16.

Urick, V.J., Bucholtz, F., "Compensation of arbitrary chromatic dispersion in analog links using a modulation-diversity receiver", IEEE Photonics Technology Letters, vol. 17, Iss. 4, pp. 893-895, Apr. 2005.

Urick, V.J., Bucholtz, F., Devgan, P.S., McKinney, J.D., "Analog Phase Modulation for Avionics Applications", Avionics, Fiber-Optics and Photonics Technology Conference, 2007 IEEE, Oct. 2-5, 2007, pp. 7-8.

Urick, V.J., Bucholtz, F., Devgan, P.S., McKinney, J.D., and Williams, K.J., "Phase Modulation with Interferometric Detection as an Alternative to Intensity Modulation with Direct Detection for Analog-Photonic Links", IEEE Trans. Microwave Theory Tech., vol. 55, No. 9, pp. 1978-1985, Sep. 2007.

Urick, V. J., Rogge, M.S., Knapp, P.F., Swinden, L., Bucholtz, F., "Wide-Band Predistortion Linearization for Externally Modulated Long-Haul Analog Fiber-Optic Links", IEEE Trans. Microwave Theory Tech., vol. 54, Iss. 4, Part 1, pp. 1458-1563, Jun. 2006.

Urick, V.J., Qiu, J.X., Bucholtz, F., "Wide-band QAM-over-fiber using phase modulation and interferometric demodulation", IEEE Photonics Technology Letters, vol. 16, Iss. 10, pp. 2374-2376, Oct. 2004.

Urick, V.J., Hastings, A.S., McKinney, J.D., Devgan, P.S., Williams, K.J., Sunderman, C., Diehl, J.F., Colladay, K.,"Photodiode Linearity Requiremetns for Radio-Frequency Photonics and Demonstration of Increased Performance using Photodiode Arrays", 2008 IEEE.

Weiner, A.W., McKinney, J.D., Peroulis, D., "Photonically Synthesized Waveforms to Combat Broadband Antenna Phase Distortions", MWP 2007, IEEE, International Topical Meeting on Microwave Photonics, conference date Oct. 3-5, 2007, pp. 82-83.

Williams, K.J., Nichols, L.T., Esman, R.T., "Photodetector Nonlinearity Limitations on a High-Dynamic Range 3 GHz Fiber Optic Link", J. Lightwave Tech., vol. 16, No. 2, pp. 192-199, Feb. 1998.

* cited by examiner

LINEARIZED PHASE MODULATED ANALOG OPTICAL LINKS

CROSS-REFERENCE TO RELATED APPLICATIONS

This application is a nonprovisional under 35 U.S.C. §119 (e) of provisional application 61/046,127 filed on Apr. 18, 2008, the entire disclosure of which is incorporated herein by reference.

BACKGROUND OF THE INVENTION

1. Field of the Invention

This application is related to microwave photonics and analog optical links, and more specifically, to receivers for demodulating phase modulated analog optical links.

2. Related Technology

The use of photonic links in radio-frequency (RF), microwave and millimeter-wave applications such as antenna remoting, radio-over-fiber, and phased-array radar has greatly increased in the past decades. Advantages of microwave photonics include large inherent bandwidth, immunity to electromagnetic interference, and small size.

Microwave photonic devices are described in A. J. Seeds, "Microwave photonics," IEEE Trans. Microwave Theory Tech., vol. 50, no. 3, pp. 877-887, March 2002.

Many microwave photonics applications use intensity modulation of a continuous wave laser beam at the transmitter end of the link, and a photodetector at the receive end of the link. An intensity modulated analog optical system is described in K. Williams, L. T. Nichols, and R. D. Esman disclose a direct detection photodetection receiver in "Photodetector nonlinearity limitations on a high-dynamic range 3 GHz Fiber Optic Link", J. Lightwave Technol., Vol. 16, No. 2, pp. 192-199, February 1998.

Progress in reducing signal predistortion in the optical domain using linearized modulators for intensity-modulated links is described L. M. Johnson and H. V. Roussell, "Reduction of intermodulation distortion in interferometric optical modulators," Opt. Lett., vol. 13, pp. 928-930, 1988.

Techniques that exploit the wavelength dependence of the electro-optic modulation process in interferometric optical modulators for an intensity modulated systems are described in E. I. Ackerman, "Broad-band linearization of a mach-zehnder electrooptic modulator," IEEE Trans. Microwave Theory Tech., vol. 47, no. 12, pp. 2271-2279, December 1999; E. I. Ackerman, "Linearization of a Broadband Analog Optical Link Using Multiple Wavelengths", MWP'98, IEEE International Topical Meeting on Microwave Photonics, MC5, pp. 45-48, October 1998; and in H. Kolner and D. W. Dolfi, "Intermodulation distortion and compression in an integrated electrooptic modulator," Appl. Opt., vol. 26, pp. 3676-3680, September 1987.

B. Haas and T. E. Murphy, "Suppression of intermodulation distortion in phase-modulated analog photonic links," MWP 2006, International Topical Meeting on Microwave Photonics, October 2006 describes a linearization technique that exploits the polarization dependence of the electro-optic modulation process in interferometric optical modulators.

Reduction of third order intermodulation distortion for electro-optic modulators by adjusting polarization components of the signal is described in L. M. Johnson and H. V. Roussell, "Reduction of intermodulation distortion in interferometric optical modulators," Opt. Lett., vol. 13, pp. 928-930, 1988 and in L. M. Johnson and H. V. Roussell, "Reduction of Intermodulation Distortion in Interferometric Optical Modulators", Laser and Electro-Optical Society Conference, 1988, Paper OE7.6, pp. 119-120.

Techniques for increasing the linearity of an electro-optic intensity modulator using feed forward sections in a directional coupler are described in M. L. Farwell, Z.-Q. Lin, E. Wooten, and W. S. C. Chang, "An electrooptic intensity modulator with improved linearity," IEEE Photon. Technol. Lett., vol. 3, no. 9, pp. 792-795, September 1991.

A linearization technique that exploits electronic predistortion is described in V. J. Urick, M. S. Rogge, P. F. Knapp, L. Swingen, and F. Bucholtz, "Wide-band predistortion linearization for externally modulated longhaul analog fiber-optic links," IEEE Trans. Microwave Theory Tech., vol. 54, no. 4, pp. 1458-1463, 2006.

There has also been significant emphasis on raising the performance of analog photonic links to the level of state-of-the-art microwave components and systems. Recent work has emphasized decreasing the noise figure of these links to below 10 dB, as described in J. D. McKinney, M. Godinez, V. J. Urick, S. Thaniyavam, W. Charczenko, and K. J. Williams, "Sub-10 db noise figure in a multiple-GHz analog optical link", IEEE Photon. Technol. Lett., Vol. 19, No. 7, pp. 456-457, Apr. 1, 2007.

Some analog photonic links rely on transmitting a phase modulated optical signal, with interferometric detection at the receiver. An example of such a link is described in F. Bucholtz, V. J. Urick, M. S. Rogge, and K. J. Williams, "Performance of analog photonic links employing phase modulation," in Coherent Optical Technologies and Applications, Technical Digest (CD), paper CFAG, pp. 1-3, Optical Society of America, 2006.

Phase modulated links with interferometric detection architecture are also disclosed in V. J. Urick, F. Bucholtz, P. S. Devgan, J. D. McKinney, and K. J. Williams, "Phase Modulation with Interferometric Detection as an Alternative to Intensity Modulation with Direct Detection for Analog-Photonic Links", IEEE Trans. Microwave Theory Tech., Vol. 55, No. 9, pp. 1978-1985, September 2007; in F. Bucholtz, V. J. Urick, M. S. Rogge, and K. J. Williams, "Performance of analog photonic links employing phase modulation," in Coherent Optical Technologies and Applications, Technical Digest (CD), paper CFAG, pp. 1-3, Optical Society of America, 2006; and in V. J. Urick, F. Bucholtz, P. S. Devgan, J. D. McKinney, "Analog Phase Modulation for Avionics Applications", Avionics, Fiber-Optics, and Photonics Technology Conference, 2007 IEEE, pp. 7-8, 2-5 Oct. 2007.

A technique for linear demodulation of phase-encoded signals at a receiver is described in T. R. Clark and M. L. Dennis, "Coherent Optical Phase-Modulated Link", IEEE Photonic Technology Letters, Vol. 19, No. 16, pp. 1206-08, Aug. 15, 2007, and in M. L. Dennis and T. R. Clark Jr., "Optimally Biased Coherent I/Q Analog Photonic Link," in Conference on Lasers and Electro-Optics/Quantum Electronics and Laser Science Conference and Photonic Applications Systems Technologies, OSA Technical Digest (CD) (Optical Society of America, 2008), paper CMP6.

Chen, H. R. Fetterman, A. Chen, W. H. Steier, L. R. Dalton, W Wang, and Y. Shi, "Demonstration of 110 GHz electro-optic polymer modulators", Appl Phys. Lett., vol. 70(25), pp. 3335-3337, June 1997, describes a traveling wave polymer phase modulator.

Polarization dependent LiNbO3 modulators, which had previously been used to linearize intermodulated direct detection (IMDD) links, have recently been shown to suppress the third-order intermodulation distortion in a coherent phase modulated analog link, in B. M. Haas and T. E. Murphy, "A simple, linearized, phase-modulated analog optical transmission system," IEEE Photon. Technol. Lett., vol. 19, no. 10, pp. 729-731, May 2007.

Optical fiber networks that can transmit and receive both intensity modulated analog signals and phase modulated digital signals are described in Devgan, P., Urick, V., McKinney, J., Williams, K., "Hybrid Analog-Digital Fiber Optic Network for Aircraft Communication and Control", Avionics, Fiber-Optics and Photonics Technology Conference, 2007 IEEE, 2-5 Oct. 2007, pp. 17-18. A dispersion-compensated receiver both intensity modulated optical signals and phase modulated optical signals is described in V. J. Urick, F. Bucholtz, "Compensation of arbitrary chromatic dispersion in analog links using a modulation-diversity receiver", IEEE Photonics Technology Letters, Vol. 17, Iss. 4, pp. 893-895, April 2005.

A millimeter wave radio-over-fiber transmission technique using an ASK modulated carrier is disclosed in L. A. Johansson and A. J. Seeds, "36-GHz 140-Mb/s radio-over-fiber transmission using an optical injection phase-lock loop source," IEEE Photon. Technol. Lett., vol. 13, no. 8, pp. 893-895, August 2001. A QAM-over-fiber system using optical phase modulation is described in V. J. Urick, M. S. Rogge, P. F. Knapp, L. Swingen, F. Bucholtz, "Wide-Band Predistortion Linearization for Externally Modulated Long-Haul Analog Fiber-Optic Links", IEEE Trans. Microwave Theory Tech., Vol. 54, Iss. 4, Part 1, pp. 1458-1563, June 2006.

Analog optical systems can be used in phased array antenna systems, electronic warfare, communications systems, and other applications. Phased array radar system applications are described in Dolfi, D. Mongardien, S. Tonda, M. Schaller, and J. Chazelas, "Photonics for airborne phased array radars," in IEEE International Conference on Phased Away Systems and Technology, pp. 379-382, 22-25 May 2000.

The system, method, and devices of the invention each have several aspects, no single one of which is solely responsible for its desirable attributes. Without limiting the scope of this invention as expressed by the claims which follow, its more prominent features will now be discussed briefly. After considering this discussion, and after reading the section entitled "Detailed Description of Certain Embodiments" one will understand how the features of this invention provide advantages that include implementation of an analog optical link, e.g., a linearized receiver for demodulating RF signals from an optical carrier, that may, for example, be implemented.

BRIEF SUMMARY OF THE INVENTION

An aspect of the invention is directed to a receiver for demodulating phase modulated analog optical signals. The receiver has a splitter for splitting said phase modulated analog optical signals into a first and a second parallel optical paths, the first optical path having an asymmetrical interferometer with a first time delay and a first photodiode optically connected to an output of the first interferometer, the second optical path having a second asymmetrical interferometer having a second time delay and a second photodiode optically connected to an output of the second interferometer. The receiver has a 180 degree hybrid coupler arranged to receive the outputs of the first and the second photodiodes and to generate a demodulated signal. The first time delay is not equal to the second time delay.

The splitter directs more power into one of the optical paths. The difference in time delays in the first interferometer and the second interferometer balances, along with the optical power imbalance, the third-order distortion in the output photocurrent and achieves a fifth-order limited link response.

The first interferometer and the second interferometer are quadrature biased.

The receiver can also include phase shift means in at least one of the optical paths arranged between the interferometer and the hybrid coupler, said phase shift means arranged to ensure the inputs to the hybrid coupler are 180 degrees out of phase.

In an exemplary embodiment, the ratio of phase modulated analog optical power directed into the first optical path to power directed into the second optical path is $$\left|\frac{P_a}{P_b}\right| = |\sin(\omega\tau_b/2)/\sin(\omega\tau_a/2)|^{n+m} = \gamma^{n+m},$$

wherein n and m are integers and n+m is the odd order of intermodulation distortion to be suppressed, $P_a$ is the optical power into the first optical path, and wherein $P_b$ is the optical power into the second optical path, $\tau_a$ is the time delay of the first interferometer, and $\tau_b$ is the time delay of the second interferometer.

The ratio of the time delay of the first interferometer and the second interferometer can be inversely proportional to the ratio of phase modulated optical power directed into the first optical path and the second optical path.

The ratio of DC photocurrents into the photodiodes can be inversely proportional to the ratio of time delays in the interferometers.

Another aspect of the invention is directed to an analog photonic link, including the receiver, a transmitter having a continuous wave laser and a phase modulator arranged to phase modulate the continuous wave laser with a suboptical frequency signal, and an optical fiber carrier carrying the phase modulated optical energy from the transmitter to the receiver. The receiver demodulates the suboptical frequency signal.

Another aspect of the invention is directed to a receiver for demodulating phase modulated analog optical signals, the receiver including a splitter for splitting the phase modulated analog optical signals into a first and a second parallel optical paths at unequal power levels, the first optical path having an asymmetrical interferometer with a first time delay, the second optical path having a second asymmetrical interferometer having a second time delay, and a balanced photodetector including at least two photodiodes. The first time delay is not equal to the second time delay. A first of the two photodiodes is arranged to receive the outputs of the first interferometer and the second of the two photodiodes is arranged to receive the output of the second interferometer. The balanced photodetector demodulates the phase modulated analog optical signal.

The first interferometer and the second interferometer are quadrature biased.

The receiver can also include phase shift means in at least one of the optical paths arranged between the interferometer and the balanced photodetector, with the phase shift means arranged to ensure the inputs to the balanced photodetector are 180 degrees out of phase.

The splitter directs more of the phase modulated analog optical signal power into the one optical path. The difference in time delays in the first interferometer and the second interferometer balances, along with the optical power imbalance, the third-order distortion in the output photocurrent and achieves a fifth-order limited link response.

A ratio of power directed into the first optical path to power directed into the second optical path by the splitter is $$\left|\frac{P_a}{P_b}\right| = |\sin(\omega\tau_b/2)/\sin(\omega\tau_a/2)|^{n+m} = \gamma^{n+m},$$

wherein n and m are integers and n+m is the odd order of intermodulation distortion to be suppressed, $P_a$ is the optical power into the first optical path, $P_b$ is the optical power into the second optical path, $\tau_a$ is the time delay of the first interferometer, and $\tau_b$ is the time delay of the second interferometer.

The ratio of the time delay of the first interferometer and the second interferometer can be inversely proportional to the ratio of phase modulated optical power directed into the first optical path and the second optical path.

The a ratio of DC photocurrents into the photodiodes of the balanced photodetector can be inversely proportional to the ratio of time delays in the interferometers.

Another aspect of the invention is directed to an analog photonic link having a receiver, a transmitter having a continuous wave laser and a phase modulator arranged to phase modulate the continuous wave laser with a suboptical frequency signal, and an optical fiber carrier carrying the phase modulated optical energy from the transmitter to the receiver. The receiver demodulates said suboptical frequency signal.

DETAILED DESCRIPTION OF CERTAIN EMBODIMENTS

Embodiments of the invention are directed to a linearized phase-modulated analog photonic link that utilizes parallel interferometric demodulation to suppress the third-order intermodulation distortion present in the link. Using two parallel interferometers with different differential delays allows the system to balance the third-order distortion in the output photocurrent and achieve a fifth-order limited link response.

Figure 1:
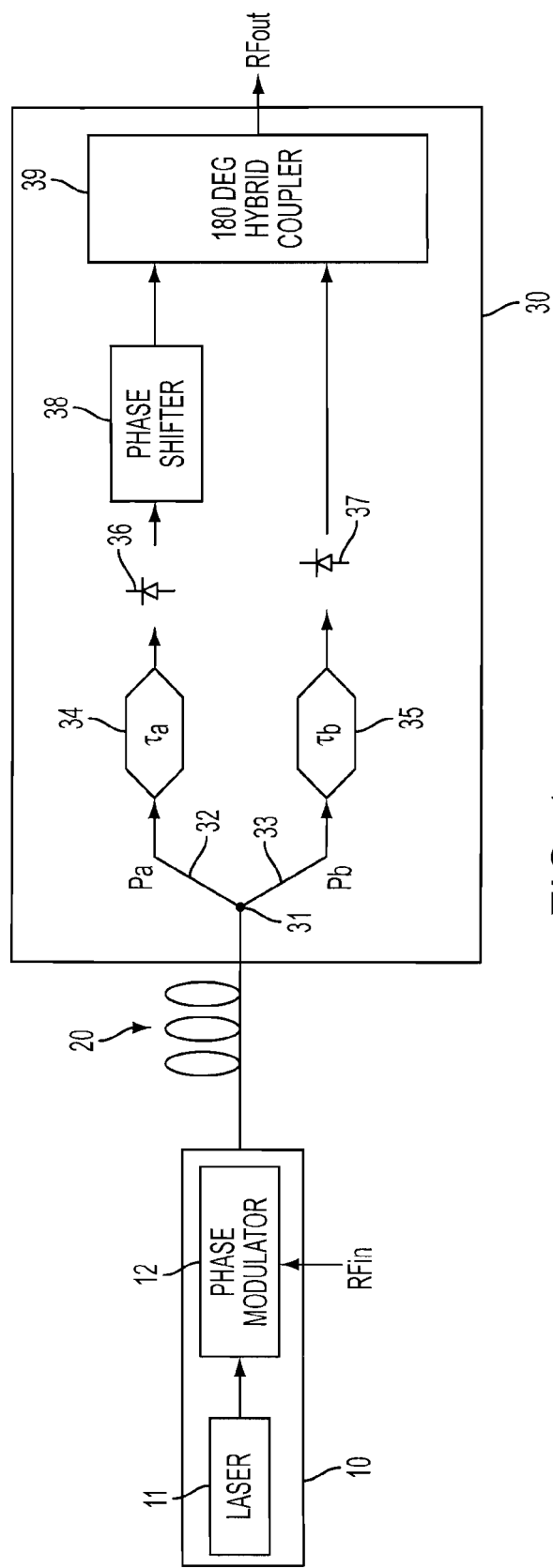
FIG. 1 illustrates an exemplary phase-modulated analog photonic link in accordance with an embodiment of the invention having parallel asymmetrical interferometers, a phase shifter, and a hybrid coupler.

FIG. 1 illustrates an exemplary embodiment of a phase-modulated analog link. A phase modulated optical signal is generated by a transmitter 10 including a laser 11 and a phase modulator 12. The phase modulator 12 phase modulates the continuous wave (cw) laser energy with an RF signal. Transmission of the phase modulated optical signal occurs over a medium such as an optical fiber 20, free space, or another transmissive material.

The term RF, as used herein, refers generally to suboptical frequencies, and more particularly, radio frequencies and microwave frequencies including, for example, 3 Hz to at least 100 GHz, and more particularly, 30 kHz to 100 GHz. The receiver 30 is arranged remote from the laser and phase modulator, and is intended to demodulate the RF signal impressed on the cw laser energy by the modulator at the transmission end of the link. The receiver 30 includes a splitter 31 to split the phase modulated optical signal into two optical paths 32 and 33, each of the paths containing an asymmetric (path-imbalanced) Mach-Zehnder interferometer 34 and 35 and a reverse-biased photodiode 36, 37. As will be discussed in greater detail in later paragraphs, the ratio of the optical power Pa/Pb directed by the splitter into each of the two paths is related to the ratio of the time delays $\tau_a$ and $\tau_b$ of the interferometers in the two paths, in order to reduce intermodulation distortion at a particular $n^{th}$ order.

Note that the path-imbalanced asymmetrical interferometers used can be any type of interferometer that operates at the optical carrier frequency of the laser and generates the necessary time delay $\tau$. Each of the interferometers used in the receiver can have, for example, two parallel paths formed of different lengths of optical fiber, or can be free-space interferometers.

Each interferometer 34 and 35 converts the applied phase modulation to a measurable intensity modulation. The intensity modulated signal from each path is then input to the photodiode 36 or 37. The output photocurrents from the photodiodes are then differenced in a 180 degree hybrid coupler 39. A phase shifter 38 is included at the output of one of the photodetectors, which delays the signal from the photodetector 36 enough to ensure that the inputs to the hybrid coupler are 180 degrees out of phase from each other. The phase delay can be in either of the two arms of the receiver.

The output of the 180 degree hybrid coupler 39 is a linearized RF output, which is the recovered RF input to the phase modulator 12 of the transmitter.

The time delays $\tau_a$ and $\tau_b$ of the interferometers 34 and 35 must be different. The time delays can be chosen so the null points of the interferometer response, at a frequencies of $1/\tau_a$ and $1/\tau_b$, will be outside the expected RF frequency range of the system. The time delays can be any suitable value, however, longer time delay interferometers are typically larger in size, so smaller time delays can produce a more compact system.

In an exemplary embodiment, the laser 11 is a high-power 150 mW CW erbium doped fiber laser commercial available from NP Photonics as model FLS-150-3, operating at a wavelength within the range of 1530 and 1565 nm. The output of the laser 11 is phase modulated with a low-$V_\pi$ LiNbO$_3$ traveling wave phase modulator 12 with a two-tone input. The two tone input can be at 1.01 GHz and 1.02 GHz. Suitable phase modulators are commercially available from EOSpace, Inc., and other manufacturers. The asymmetric Mach-Zehnder (AMZ) interferometer can be a differential phase shift keying demodulator, such as those commercially available from Avensys, or another manufacturer.

Other operational wavelengths can be, for example, about 1 micron or about 1310 to 1320 nanometers.

Note that the phase modulator in the transmitter 10 uses a RF voltage to phase modulate the optical carrier wave. In contrast, the asymmetrical mach zehnder interferometers in the receiver 30 convert the phase modulated optical signal to an intensity modulated optical signal by relying on a difference in path length, and do not impress a RF signal on the optical carrier.

The photodiodes can be PIN photodiodes suitable for the RF frequency band and optical carrier frequency, such as 18 GHz PIN photodiodes.

The differencing operation performed by the photodetectors 36, 37, and the hybrid coupler 39 in FIG. 1 may be performed with a true balanced detector, though the use of two separate photodiodes and a hybrid coupler offers additional flexibility in terms of choice of the AMZ bias phase, because either bias slope may be utilized.

Figure 2:
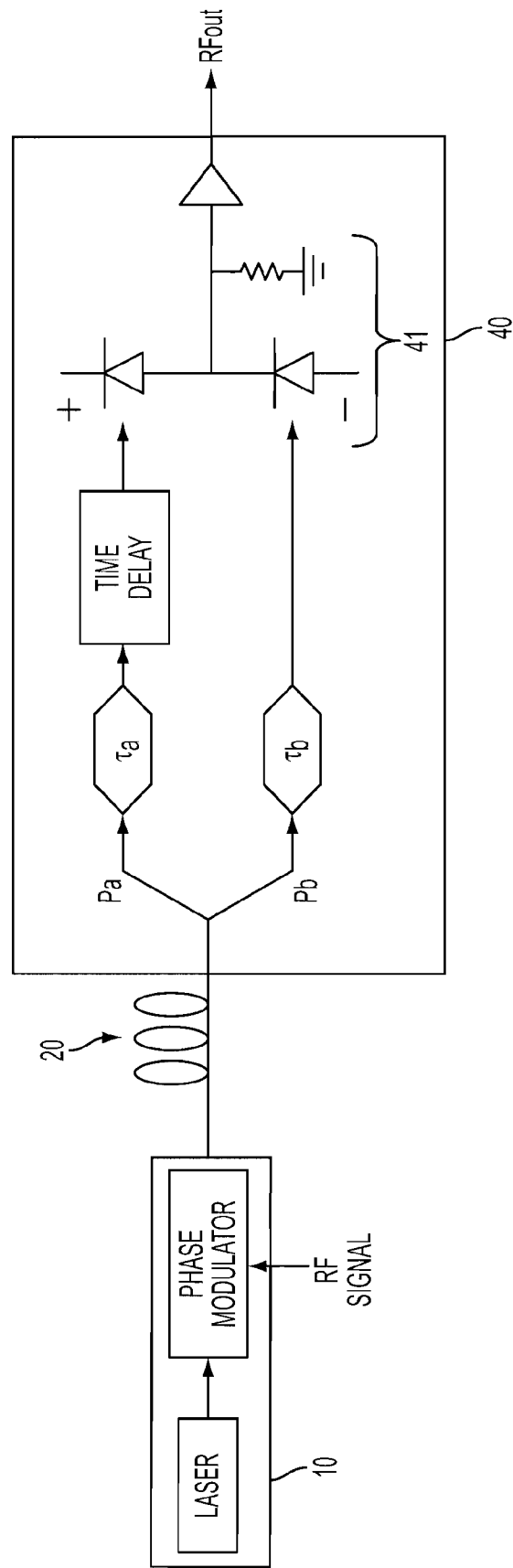
FIG. 2 illustrates an exemplary phase-modulated analog photonic link in accordance with an embodiment of the invention having parallel asymmetrical interferometers and a balanced photodetector pair.

FIG. 2 illustrates a photonic link having a balanced detector in the receiver 40 instead of the photodetectors and hybrid coupler of the FIG. 1 receiver 30. The balanced photodetector 41 can be one that is commercially available, and can be a pair of closely matched photodetectors with the anode of one connected electrically to the cathode of the other, with the output signal taken from this junction.

Note that in FIG. 2, one of the two parallel optical paths can also include a time delay element or phase shifter that ensures that the optical power in the two optical paths is 180 degrees out of phase into the balanced photodetector. The phase shifter can be a variable optical delay line, for example, in both the FIG. 1 and FIG. 2 receivers.

A discussion of the theory related to the FIG. 1 phase modulated link is provided as follows.

The RF gain of the phase modulated (ΦM) link is a function of the RF frequency, which depends on the transfer function of the interferometer used as an optical discriminator. As seen in FIG. 1, the two interferometers have interferometer delays $\tau_a$ and $\tau_b$. By choosing the relationship between $\tau_a$ and $\tau_b$ and the optical power coupled into each interferometer, one can balance the amplitudes of intermodulation components in the RF domain. By differencing the photocurrents obtained from each interferometer, it is then possible to suppress a given order of intermodulation distortion (IMD) while retaining the fundamental response of the link.

Figure 3:
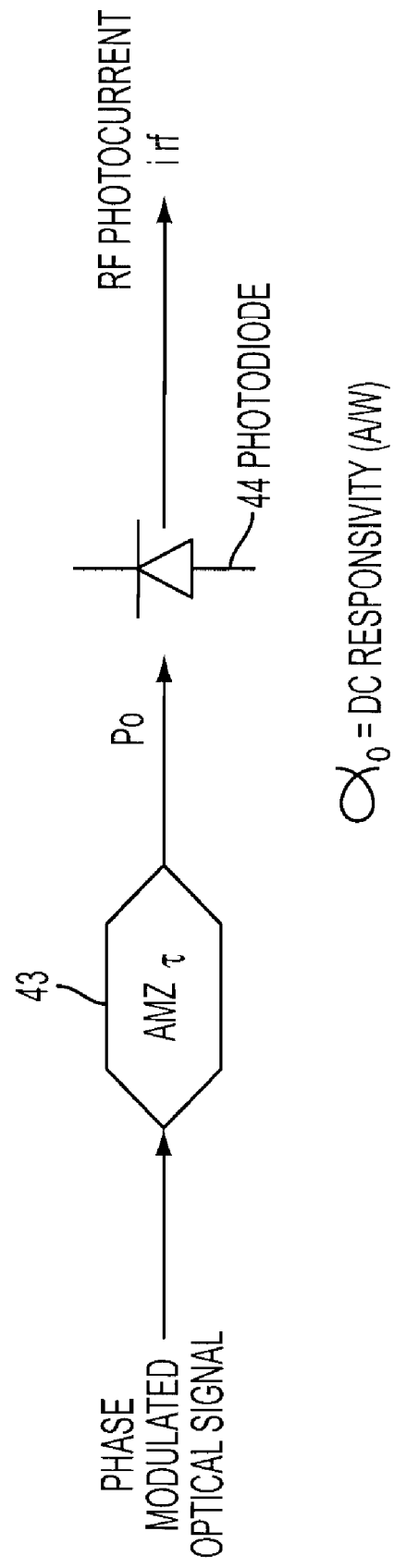
FIG. 3 illustrates a single quadrature-biased asymmetrical mach-zehnder interferometer and photodiode, which corresponds to an arm of the receiver of FIG. 1 or FIG. 2.

FIG. 3 illustrates a single quadrature-biased asymmetrical mach-zehnder interferometer 43 and photodiode 44, which corresponds to an arm of or optical path of the receiver 30 of FIG. 1 or receiver 40 of FIG. 2. For the single quadrature-biased asymmetrical mach-zehnder interferometer and photodiode shown in FIG. 3, assuming a phase modulated optical input signal, the output photocurrent for a single photodiode is:

$$i_{rf}(t) = I_{dc}\{1 \pm \sin[\phi(t-\tau) - \phi(t)]\} \quad (1)$$

Here, $I_{dc} = \alpha_0 P_0$ is the per-diode DC photocurrent, $\alpha_0$ is the DC photodiode responsivity (A/W), and $P_o$ is the received time-averaged optical power in Watts received at the photodiode. The argument $\phi(t)$ is the optical phase shift resulting from the applied RF input signal, and $\tau$ is the differential delay of the interferometer.

Two-tone measurement techniques can be used to characterize intermodulation distortion of RF components. For a two-tone measurement, the optical phase shift is of the form $$\phi(t) = \pi \frac{V_{in}}{V'_\pi}[\sin(\omega_1 t) + \sin(\omega_2 t)] + \phi_b \quad (2)$$

where $V_{in}$ is the amplitude of the applied signal, $\phi_b$ is the interferometric bias phase, and $V'_\pi$ is the effective halfwave voltage. The effective halfwave voltage is proportional to the halfwave voltage $V_\pi$ of the phase modulator and inversely proportional to the RF transfer function of the optical link. The effective halfwave voltage describes the RF efficiency of the link.

The AMZ transfer function is sinusoidal in optical frequency. Therefore, the RF transfer function, in terms of the output current, is also sinusoidal. The effective halfwave voltage $V'_\pi$ includes the sinusoidal response and can be written as $$V'_\pi = V_\pi / \sin(\omega \tau / 2). \quad (3)$$

Figure 4:
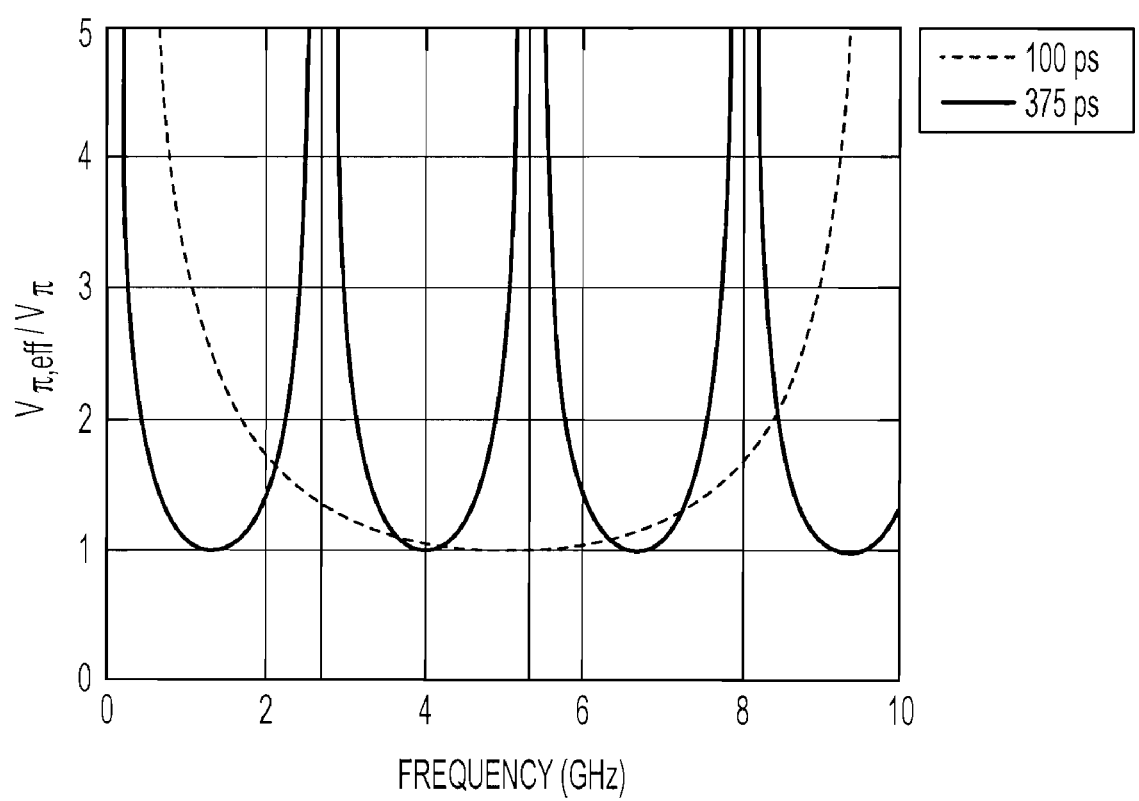
FIG. 4 shows the effective halfwave voltage $V'_\pi$ for interferometers with differential delays of $\tau_1$=100 ps and $\tau_2$=375 ps.

To illustrate the concept of the effective halfwave voltage, FIG. 4 shows the effective halfwave voltage $V'_\pi$ (shown as $V_{eff,\pi}$ in FIG. 4) for interferometers with differential delays of $\tau_1 = 100$ picoseconds (dashed line) and $\tau_2 = 375$ picoseconds (solid line), both normalized to the halfwave voltage of the phase modulator. As the effective halfwave voltage increases, the gain of the analog link decreases. As the halfwave voltage increases toward infinity, the link gain approaches zero. Therefore, the effective halfwave voltage provides an intuitive way to view the impact of the sinusoidal response of the interferometer on the link gain.

In contrast to the modulator halfwave voltage, the effective halfwave voltage changes polarity every half cycle. This has no effect on the RF gain of a single link, however, in systems using two parallel links in a balanced or differential configuration, the polarity change must be addressed. For example, the subtraction operation in the 180 degree hybrid coupler in FIG. 1 addresses the polarity changes from the interferometers.

By expanding Equation (1) for the received photocurrent for a single AMZ and photodiode to include a two-tone input and a quadrature biased AMZ ($\phi_b = \pi/2$ in Equation (2)), it is seen that the output RF signal will have only odd-order harmonics and intermodulation distortion. The full expression for the output photocurrent is given by $$i_{out}(t) = 2\alpha I_{dc} \sum_{n=0}^{\infty} \sum_{m=0}^{\infty} J_n\left(2\pi \frac{V_{in}}{V'_\pi}\right) J_m\left(2\pi \frac{V_{in}}{V'_\pi}\right) \times \cos[(n\omega_1 \pm m\omega_2)t] \quad (4)$$

In Equation (4), $J_n$ and $J_m$ are Bessel functions of the first kind. The weighting factor $\alpha$ accounts for any system specific variations in frequency response, e.g., frequency response of the photodiode, insertion and excess loss in the hybrid coupler, etc. For a receiver using photodiodes with an internal 50 ohm matching resistor and a hybrid coupler to accomplish differential detection, the weighting factor is ideally $\alpha = 1/(2° \sqrt{2})$. For an ideal balanced detector with internal matching resistors, such as in FIG. 2, the weighting factor is $\alpha = 1/2$.

The amplitude of the fundamental response at frequencies $\omega_1$ and $\omega_2$ is given by $$i_f = 2\alpha I_{dc} J_0\left(2\pi \frac{V_{in}}{V'_\pi}\right) J_1\left(2\pi \frac{V_{in}}{V'_\pi}\right) \quad (5)$$

The limiting distortion components are the in-band third-order intermodulation products (at frequencies $2\omega_2-\omega_1$ and $2\omega_1-\omega_2$). The amplitude of these distortion terms is given by $$i_3 = 2\alpha I_{dc} J_1\left(2\pi \frac{V_{in}}{V'_\pi}\right) J_2\left(2\pi \frac{V_{in}}{V'_\pi}\right) \quad (6)$$

The term "linearized", as used herein, describes an analog link in which the dominant term in a power series expansion of Equation (6) is suppressed.

To explain the linearization operation, the small signal condition $V_{in} \ll V'_\pi$ is used in the power series expansions of the Bessel functions in Equations (5) and (6). From the Equation (3) definition of the effective halfwave voltage, it is seen that the small signal condition reduces to the conventional $V_{in} \ll V_{\pi,modulator}$ at the peak in the interferometer response [$\sin(\omega\tau/2)=1$]. When operating off-peak, the increase in effective halfwave voltage allows small-signal analysis over a wider range of input voltages. For the fundamental response in Equation (5), retaining only the terms in the first order in the input voltage, the small signal fundamental photocurrent is $$i_f = 2\pi\alpha I_{dc} \frac{V_{in}}{V'_\pi} \quad (7)$$

Performing the expansion for $J_1$ and $J_2$ in Equation (6), multiplying, and keeping terms to fifth-order in the input voltage yields the small-signal intermodulation distortion (IMD) photocurrent amplitudes $$i_3 = \alpha I_{dc}\left[\left(\pi \frac{V_{in}}{V'_\pi}\right)^3 - \frac{5}{6}\left(\pi \frac{V_{in}}{V'_\pi}\right)^5\right] \quad (8)$$

Note, the cubic term in Equation (8) is the dominant distortion term in a conventional ΦM analog link and is the term we seek to suppress in this work. As is evident, the amplitude of both the fundamental and distortion photocurrents depend on the DC photocurrent and the effective halfwave voltage at the fundamental frequency $\omega$.

Consider next the phase modulated (ΦM) analog link in FIG. 1 in which two interferometers with differential delays $\tau_1$ and $\tau_2$ are used to demodulate the phase-modulated optical signal and the resulting photocurrents are differenced.

The magnitude $\gamma$ of the ratio of effective halfwave voltages for the two interferometers can be defined as $$\gamma = \left|\frac{V'_{\pi,1}}{V'_{\pi,2}}\right| = \left|\frac{\sin(\omega\tau_2/2)}{\sin(\omega\tau_1/2)}\right|. \quad (9)$$

The fundamental and distortion photocurrent terms at the link output can be written, respectively, as $$i_f = 2\pi\alpha_1 I_{dc,1} \frac{V_{in}}{V'_{\pi,1}}\left(1 - \frac{\alpha_2}{\alpha_1}\frac{I_{dc,2}}{I_{dc,1}}\gamma\right) \quad (10)$$

and $$i_3 = \alpha_1 I_{dc,1}\left[\left(\pi\frac{V_{in}}{V'_{\pi,1}}\right)^3\left(1 - \frac{\alpha_2}{\alpha_1}\frac{I_{dc,2}}{I_{dc,1}}\gamma^3\right) - \frac{5}{6}\left(\pi\frac{V_{in}}{V'_{\pi,1}}\right)^5\left(1 - \frac{\alpha_2}{\alpha_1}\frac{I_{dc,2}}{I_{dc,1}}\gamma^5\right)\right]. \quad (11)$$

When the photocurrents from two separate detectors are combined using a bulk electrical coupler such as a hybrid coupler, either bias slope of the interferometers can be used so long as the necessary 180 degree phase shift exists between the two currents at the link output. The bias slope will be positive or negative, and the sum or difference port of the hybrid coupler is chosen accordingly. Equation (11) shows that one can suppress the cubic contribution to the third-order intermodulation distortion (IMD) by choosing the DC photocurrents $I_{dc,1}$ and to satisfy the condition $$\frac{\alpha_2}{\alpha_1}\frac{I_{dc,2}}{I_{dc,1}} = \gamma^{-3} \quad (12)$$

For this choice of photocurrents, the cubic contribution to the third order intermodulation distortion, which is the largest distortion term in Equation (11), will be removed and the fundamental response of the link $i_f$ will remain, although decreased in amplitude (Equation (10)).

To generalize for n+m odd order intermodulation distortion, where n and m are integers, the odd order intermodulation distortion at the output of the link is proportional to the input optical powers $P_a$ and $P_b$ and to the interferometric delays ($\tau_a$ and $\tau_b$). This relationship can be expressed as $$|i_{n\omega_1 \pm m\omega_2}| \propto P_a[\sin(\omega\tau_a/2)]^{n+m} - P_b[\sin(\omega\tau_b/2)]^{n+m}. \quad (13)$$

Thus, to minimize the intermodulation distortion at a particular order, the input phase modulated optical signal is split between the two parallel optical paths with a power ratio $P_a/P_b$ according to the equation:

$$\left|\frac{P_a}{P_b}\right| = |\sin(\omega\tau_b/2)/\sin(\omega\tau_a/2)|^{n+m} = \gamma^{n+m}, \quad (14)$$

which is equivalent to the linearization condition of Equation (12) above.

Since $\gamma$ is the ratio of the effective halfwave voltages (Equation (9) and depends on the time delays of the interferometers, the n+m th order intermodulation distortion can be suppressed by choosing the optical powers in a ratio that satisfies the linearity condition for that order of intermodulation. The increased optical power in one of the optical paths produces a larger $I_{dc}$ for that optical path, which counterbalances the lower effective halfwave voltage $V'_\pi$. Thus, for the cubic contribution to the intermodulation distortion, the optical power into each of the interferometers can be adjusted until the ratio of DC photocurrents satisfies the linearity condition of Equation (12).

Note that the linearity condition of Equation (12) can also be satisfied by adjusting the $I_{dc}$ ratio by attenuating the optical power in one of the parallel optical paths at any point in the optical path before the photodiode.

Link Gain and Spur-Free Dynamic Range

Two primary link metrics of interest are the link gain and the spur-free dynamic range. Other metrics, such as link noise figure and compression dynamic range, may be readily derived using the link gain, effective halfwave voltage, and total received DC photocurrent.

Given a time-average RF input power to the link of $P_{in}=|V_{in}|^2/(2R_i)$, where $R_i$ is the input resistance of the phase modulator, and the time-average output power from the link $P_{out}=|i_f|^2 R_o/2$, where $R_o$ is the output resistance seen by the photodiode and $i_f$ is given by Equation (10), the small-signal RF gain may be written as $$G = \alpha_1^2 \left(2\pi \frac{I_{dc,1}}{V'_{\pi,1}}\right)^2 R_o R_i \left|1 - \frac{\alpha_2}{\alpha_1} \frac{I_{dc,2}}{I_{dc,1}} \gamma \right|^2 \quad (15)$$

$$= \alpha_1^2 G_{\Phi M,1} \left|1 - \frac{\alpha_2}{\alpha_1} \frac{I_{dc,2}}{I_{dc,1}} \gamma \right|^2$$

Thus, the gain of the linearized link is equal to the gain of a conventional ΦM link ($G_{\Phi M,1}$) multiplied by a scaling factor $$\alpha_1^2 \left|1 - \frac{\alpha_2}{\alpha_1} \frac{I_{dc,2}}{I_{dc,1}} \gamma \right|^2$$

that represents the gain penalty for differencing the fundamental photocurrents.

The linearity of the link can be characterized using linear approximations to the fundamental and intermodulation distortion (IND) responses. The first step in determining the link dynamic range is to find the output N-th order intercept point ($OIP_N$), which is the output power at which the linear approximations to the fundamental and IMD responses are equal. In general, the N-th order intercept point $OIP_N$ (in Watts) is given, in terms of the fundamental output power $P_1$ and N-th order distortion output power $P_N$, by the expression $$OIP_N = \left(\frac{P_1^N}{P_N}\right)^{1/(N-1)} \quad (16)$$

This expression is particularly useful when the distortion is known to be of a particular order, in that it allows a singlepoint ($P_1$, $P_N$) measurement of the output intercept point. Another useful form for characterizing measured data is obtained by expressing the output power as a power series of the input power $$\left[P_{out} = \sum P_N = \sum G_N P_{in}^N, \right.$$
$$\left. \text{with } G_N \text{ in } W^{-(N-1)}\right].$$

This simplification allows the output intercept point to be expressed as a function of only the fundamental and N-th order series coefficients $G_1$ and $G_N$, which can be determined from experimental data.

$$OIP_N = \left(\frac{G_1^N}{G_N}\right)^{1/(N-1)} \quad (17)$$

For an electrical measurement receiver bandwidth of Be (Hz), the unitless N-th order limited dynamic range can be written as $$SFDR_N = \left(\frac{OIP_N}{N_o B_e}\right)^{(N-1)/N} \quad (18)$$

where $N_o$ is the output noise power spectral density per unit bandwidth (W/Hz).

By calculating the fundamental output power from the photocurrent given by Equation (10) and the distortion power from Equation (11), and assuming the cubic term has been completely suppressed, the quintic-limited third-order intercept point is obtained as:

$$OIP_{3,5} = \alpha_1^2 4 I_{dc,1}^2 R_o \sqrt{\frac{3}{5} \left[\frac{|1-\gamma^{-2}|^5}{|1-\gamma^2|}\right]^{1/2}}. \quad (19)$$

The third-order is denoted by the subscript 3 and the quintic-limitation is denoted by the subscript 5 in the $OIP_{3,5}$ term in Equation (19).

Note that the quintic-limited third-order intercept point is equal to a scaled version of the (cubic-limited) third-order intercept of the ΦM links discussed in B. H. Kolner and D. W. Dolfi, "Intermodulation distortion and compression in an integrated electrooptic modulator", Appl. Opt., Vol. 26, pp. 3676-3680, 1987 and in E. E. Funk, V. J. Urick, S. J. Strutz, J. L. Dexter, and K. J. Williams, "110 km 256-qam digital microwave over fiber link", IEEE-MTS Digest, June 2003, pp. 269-272. The cubic limited third order intercept is denoted here as.

Substituting Equation (19) into Equation (18) and assuming shot noise dominates the output noise power spectral density, the unitless quintic limited spur free dynamic range unitless is found as $$SFDR_5^{(2\omega_1-\omega_2)} = \left[\alpha_1 \frac{2}{q} \frac{I_{dc,1}}{B_e} \sqrt{\frac{3}{5}} \left(\frac{1}{1+\gamma^{-3}}\right) \times \left(\frac{|1-\gamma^{-2}|^5}{|1-\gamma^2|}\right)^{1/2}\right]^{4/5}. \quad (20)$$

The dynamic range is only limited by the quintic term in Equation (11) at one particular frequency [see Equation (9)] for the current ratio given by Equation (12)—the cubic contribution to the distortion will dominate away from this particular operating point.

The cubic-limited third order dynamic range can be determined as follows. Following the procedure outlined above [assuming the cubic contribution to the distortion photocurrent is dominant in Equation (11) and assuming a shot noise limited link] the cubic-limited third-order intercept point (W) and cubic-limited spur-free dynamic range (unitless) are given, respectively, by $$OIP_3^{(2\omega 1-\omega 2)} = \alpha_1^2 4I_{dc,1}^2 Z_o \frac{\left|\frac{1-\gamma(\alpha_2 I_{dc,2})}{(\alpha_1 I_{dc,1})\exp(j\Delta\phi)}\right|^3}{\left|\frac{1-\gamma^3(\alpha_2 I_{dc,2})}{(\alpha_1 I_{dc,1})\exp(j\Delta\phi)}\right|} \quad (21)$$

and $$SFDR_{3,3} = \quad (22)$$

$$\left[\alpha_1 \frac{2}{q}\frac{I_{dc,1}}{B_e}\frac{1}{1+(\alpha_2 I_{dc,2})/(\alpha_1 I_{dc,1})} \times \left(\left|\frac{1-\gamma(\alpha_2 I_{dc,2})}{(\alpha_1 I_{dc,1})\exp(j\Delta\phi)}\right|^3\middle/\left|\frac{1-\gamma^3(\alpha_2 I_{dc,2})}{(\alpha_1 I_{dc,1})\exp(j\Delta\phi)}\right|\right)\right]^{2/3}.$$

Example 1

In an exemplary embodiment, the FIG. 1 interferometers 33 and 34 have time delays of $\tau_1=100$ ps and $\tau_2=375$ ps, respectively. The interferometers are fiber AMZs manufactured by ITF Labs, headquartered in Montreal, Canada. The photodiodes 35 and 36 are 18 GHz model DSC40S PIN photodiodes, commercially available from Discovery Semiconductors, Inc., headquartered in Ewing, N.J. The laser is a continuous wave erbium fiber laser with about 100 mW, manufactured by NP Photonics, model FLS-150-3, and is phase modulated with a two-tone input via a low-$V_\pi$ LiNbO3 phase modulator manufactured by EO Space, Inc.

In this example, the link is chosen to be linearized at a frequency of $\omega_1/2\pi=1.01$ GHz since this is near the peak response of the $\tau_2=375$ ps interferometer and filters in the 1 GHz band are readily available. For this frequency the ratio of effective halfwave voltages [Equation (9)] is equal to 2.97, which yields a photocurrent ratio of $I_{dc,2}/I_{dc,1}=0.038$ to achieve linearized operation.

Experimentally, the DC photocurrents of the links employing the $\tau_1=100$ ps and $\tau_2=375$ ps interferometers are adjusted to $I_{dc,1}=8$ mA and $I_{dc,2}=0.3$ mA, respectively. The DC photocurrents are adjusted by adjusting the Pa/Pb ratio at the splitter that directs optical power into the two optical paths. These photocurrents yield a ratio of $I_{dc,2}/I_{dc,1}=0.0375$ and enable linearized link performance. To perform two-tone intermodulation experiments tones are introduced at frequencies of $\omega_1/2\pi=1.01$ GHz and $\omega_2/2\pi=1.02$ GHz.

As discussed above, the ratio of the DC photocurrents can also be adjusted by attenuating the optical power in one of the parallel optical paths at any point in the optical path before the photodiode.

The fundamental and intermodulation responses of the links are measured at 1.01 GHz and 1.02 GHz, respectively, using an electrical spectrum analyzer. A measurement bandwidth of Be=300 Hz is used for these measurements.

Figure 5:
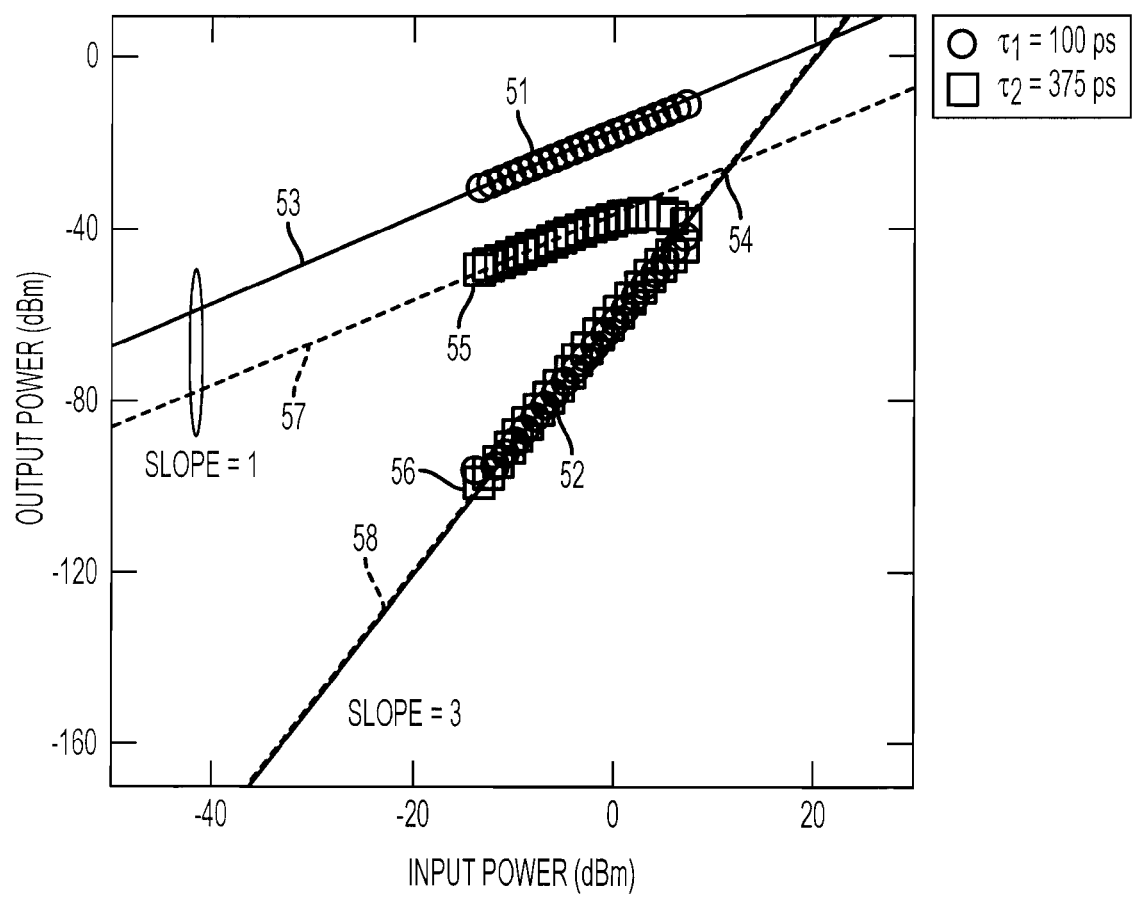
FIG. 5 illustrates the measured fundamental and intermodulation responses of the FIG. 1 system with the hybrid coupler removed and measuring the RF output measured directly at the photodiodes.

To illustrate the underlying concept of the linearization operation, the fundamental and IMD responses of a link is first measured with the hybrid coupler removed and the RF output measured directly at the photodiodes. The receiver's parallel optical paths are operating at photocurrents satisfying the linearization condition of equation (12). The results of this measurement are shown in FIG. 5, which plots the output power from the RF receiver 30 versus the input power into the phase modulator of the transmitter 10. The measured responses of the link employing the $\tau_1=100$ ps interferometer (link 1, $I_{dc,1}=8$ mA) are shown by the circles 51 and 52 and the measured responses of the link constructed with the $\tau_2=375$ ps (link 2, $I_{dc,2}=0.3$ mA) are shown by the squares 55.

The solid line 53 shows the linear fit to the measured log-scale fundamental response of link 1. The solid line 54 shows the linear fit to the measured log-scale IMD response of link 1. The dashed line 57 show the linear fit to the measured log-scale fundamental response of link 2. The dashed line 58 shows the linear fit to the measured IMD response of link 2. Note that the steeper slope (slope=3) curves 54 and 58 represent the cubic contribution to the intermodulation distortion. These linear fits are of the form $P_N=N P_{in}+G_N$, where N is the response order (i.e., 1 for the fundamental, 3 for third-order IMD, etc.) and $G_N$ is a fit parameter representing log-scale N-th order coefficient in the series expansion of the output power.

The measured gain $G_{1,1}(N=1)$ for link 1 is approximately $-17$ dB and the measured gain $G_{1,2}$ of link 2 is approximately $-8$ dB. In both cases the measured gain shows excellent agreement with the theoretical values expected for a ΦM that includes an AMZ and impedance matched photodiodes, based on the small signal gain, Equation (15) above, with $\alpha_1=\alpha_2=1/4$. The measured third-order coefficients of $G_{3,1}\approx-61$ dB and $G_{3,2}\approx-60$ dB clearly illustrate that the cubic components of the IMD are equal for the two links. Note that the intermodulation power is equal for both links, while the fundamental response is larger for link 1, which has the largest $I_{dc}/V_\pi'$ ratio (the gain figure-of-merit in equation (15)).

As the photocurrents are adjusted to have the same polarity, when the outputs of the links are differenced via the hybrid coupler, the largest component of third-order IMD will be suppressed and the fundamental response will be dominated by that of link 1 (the largest link gain).

Figure 6:
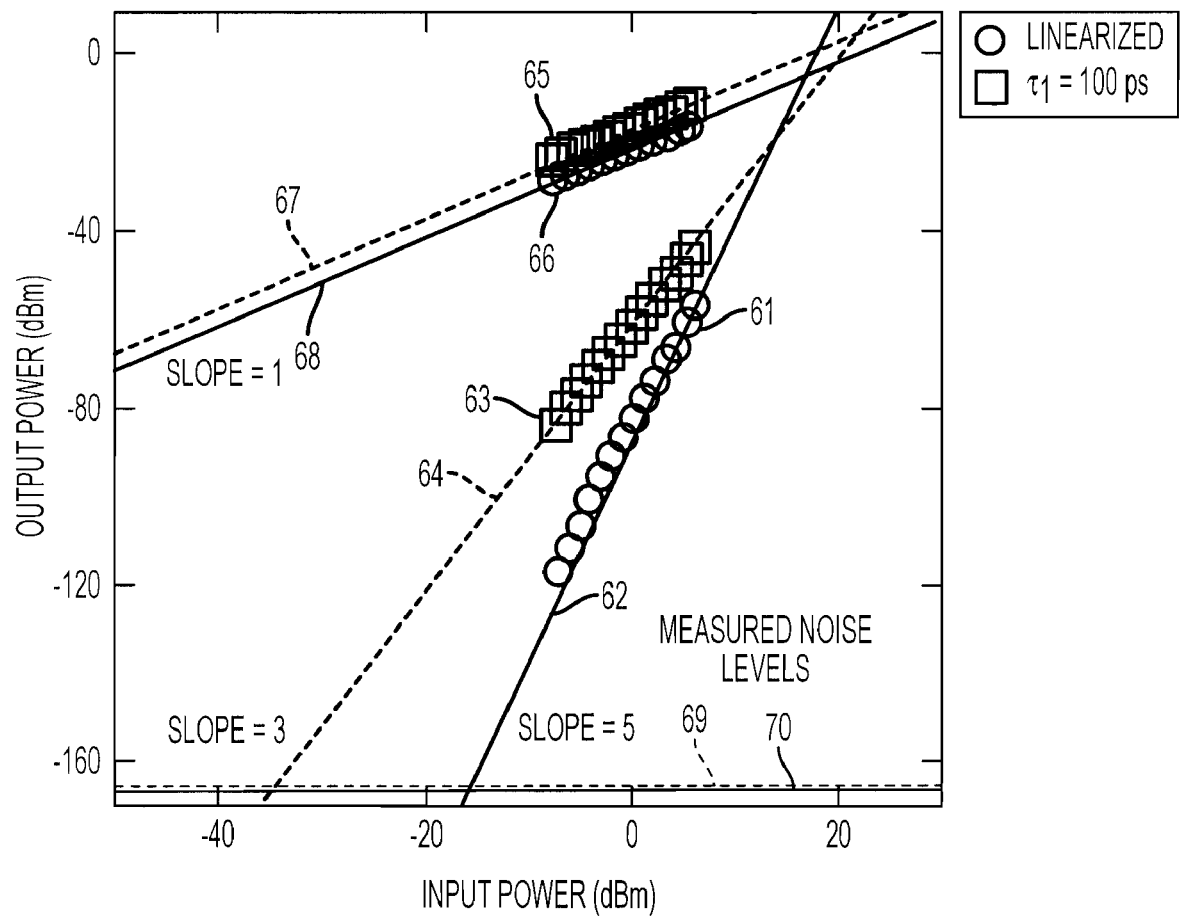
FIG. 6 illustrates the measured responses of the linearized link of FIG. 1 with the hybrid coupler included in the system.

FIG. 6 illustrates the measured response of the linearized link, when the hybrid coupler is included in the system and the two-tone measurement is repeated. To frame the response of the linearized link appropriately, its response is compared to the results in FIG. 5, in which each independent link is operating at the same total photocurrent $I_{dc,1}+I_{dc,2}=8.3$ mA, which would be the alternative ΦM architecture given a fixed source laser power.

In FIG. 6, the measured responses and linear fit for the linearized link of FIG. 1 are shown relative to the measured responses of the link 1 interferometer and photodiode.

The circles 61 are the intermodulation responses for the linearized receiver 30 of FIG. 1 and the solid line 62 is the linear fit to these points. The fundamental response for the linearized receiver 30 is shown as circles 66, with a linear fit to these points shown as the solid line 68.

For comparison, the measured intermodulation responses for a conventional link (with the link 1 time delay $\tau_1=100$ ps), are shown as squares 63, with the dashed line 64 representing a linear fit to these points. The fundamental responses for the conventional link with $\tau_1=100$ ps is shown as squares 65, with the linear fit shown as the dashed line 67.

Note that the term "conventional link" or "conventional ΦM link refers to a phase modulated analog link as described in V. J. Urick, F. Bucholtz, P. S. Devgan, J. D. McKinney, and K. J. Williams, "Phase Modulation with Interferometric Detection as an Alternative to Intensity Modulation with Direct Detection for Analog-Photonic Links", IEEE Trans. Microwave Theory Tech., Vol. 55, No. 9, pp. 1978-1985, September 2007. Such a link employs interferometric detection using a single asymmetrical mach-zehnder interferometer and a photodiode. The terms "conventional link 1" or "conventional link with time delay $\tau_1$" refer to a receiver with a single AMZ and photodiode, the AMZ having a time delay c equal to the time delay of one of the AMZs in FIG. 1 (e.g., $\tau_1$).

The horizontal lines 69 and 70 in FIG. 6 show the shot noise level per unit bandwidth for the linearized link and the conventional link with $\tau_1$, with Be=1 Hz. The shot noise level $N_o$ for the linearized link is approximately −168 dBm/Hz and the shot noise level $N_o$ for the conventional link 1 is approximately −165 dBm/Hz) links. The measured gain for the linearized link is approximately G=−21 dB and shows excellent agreement with the gain predicted by Equation (15) (with $$\alpha_1^2 = \alpha_2^2 = 1/8$$

to account for the impedance matched diodes and ideal 1/2 insertion loss of the hybrid coupler). As noted earlier and as seen by examining Equation (15), the gain of the linearized link is largely determined by that of the gain of the optical link with the higher gain (link 1). Note that link 1 also has the shorter time delay and the larger DC photocurrent. The measured gain $G_{1,1}$ for link 1 is approximately −17 dB which, after including the insertion loss of the hybrid coupler (ideally 3 dB) and gain penalty resulting from the linearization operation (approximately 1 dB), yields the linearized link gain of G=−21 dB.

FIG. 6 illustrates that the measured intermodulation distortion (IMD) response of the linearized link is clearly limited by the fifth-order term in the series expansion of the distortion output power. The measured fifth-order intercept of approximately $OIP_{3,5}$=−5 dBm and measured shot-noise level of $N_o$ approximately equal to −143 dBm (Be=300 Hz) yield a fifth-order-limited spur-free dynamic range of $SFDR_{3,5}$ approximately equal to 110 dB, and the spur free dynamic range $SFDR_{3,5}$ is approximately 130 dB when extrapolated to Be=1 Hz. Both the intercept point and dynamic range show excellent agreement with those predicted from Equations (19) and (20), which are $OIP_{3,5}$=−5 dBm and $SFDR_{3,5}$=130 dB (for Be=1 Hz), respectively. For comparison, the measured (theoretical) third order intercept and dynamic range of the link 1 operating at roughly the same total photocurrent are $OIP_{3,3}$=5 dBm (6 dBm) and $SFDR_{3,3}\approx$114 dB (113 dB), where the dynamic range is again extrapolated to a 1-Hz bandwidth.

For the linearized link, the measured $SFDR_{3,5}$ (extrapolated to a one Hz bandwidth) is approximately 130 dB, which represents an approximately 16 dB improvement over the comparison link 1 dynamic range (measured third-order $SFDR_{3,3}$ approximately 114 dB, extrapolated to a one Hz bandwidth). This agrees quite well with the theoretical value of 17 dB for a linearized link of FIG. 1.

The dynamic range of a conventional analog link (either phase modulated-ΦM or intensity modulated direct detection—IMDD) is a function of the received photocurrent and system noise floor. Therefore, the dynamic range of link 2 ($\tau_2$=375) will be equal to that of link 1—provided the links operate at the same received photocurrent level. Though the data are not shown here, the measured dynamic range for link 2 for $I_{dc,2}$=8.3 mA is $SFDR_{3,3}\approx$114 dB for Be=1 Hz, and the theoretical dynamic range $SFDR_{3,3}$ is approximately 113 dB. Thus, the linearized link shows the same improvement in dynamic range compared to the link 2 conventional ΦM system.

These results demonstrate that linearized ΦM links can achieve dynamic range performance basically equivalent to that demonstrated for many IMDD links at the same photocurrent levels.

Bandwidth and Tunability

The linearization technique of FIG. 1 depends on differencing two appropriately scaled intermodulation currents. This means that the link dynamic range is only truly "linearized" (in the sense that the cubic contribution to the third-order IMD is completely suppressed) at one particular frequency—the frequency at which the linearization condition of Equation (12) holds. Therefore, the bandwidth over which the linearized architecture still out-performs a conventional analog link is considered.

To illustrate the frequency-dependence of the linearization technique, the DC current ratio between the two optical paths is maintained such that the link is linearized at a frequency of $\omega/2\pi$=1.01 GHz and the two-tone excitation frequencies are varied over the range of 200 MHz-2 GHz (for a fixed RF power level and tone spacing of 10 MHz). By measuring the fundamental and IMD power levels, the output intercept point and dynamic range can be found using Equations (16) and (18) above. This single-point measurement of the dynamic range assumes the dependence of the intermodulation distortion on the fundamental response is known (i.e., cubic, quintic, etc). Therefore, at each point the input power is varied slightly to measure the slope of the IMD power. The measured dynamic range (extrapolated to a 1-Hz bandwidth) is shown in FIG. 7 by the circles 71.

Figure 7:
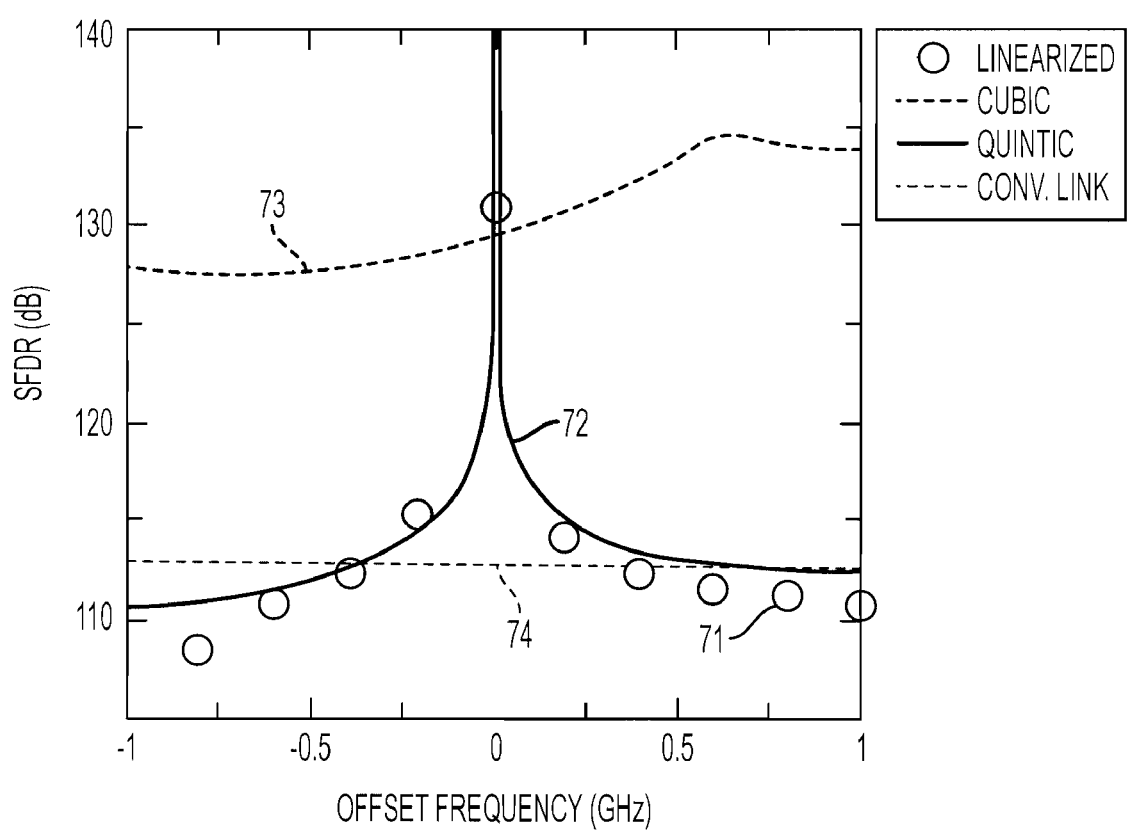
FIG. 7 shows the measured dynamic range of the FIG. 1 system.

FIG. 7 also shows the calculated cubic-limited dynamic according to equation (22) as a solid line 72, and the calculated quintic-limited dynamic range according to equation (20) as a dashed line 73. For comparison, FIG. 7 also shows the cubic-limited third-order dynamic range for a conventional (ΦM or IMDD) link as a dashed line 74. The excellent agreement between the calculated cubic-limited dynamic range and the measured dynamic range for the linearized link of FIG. 1 shows that the linearized link dynamic range is cubic-limited for virtually all frequencies, except at the chosen operating frequency where it reaches its maximum value of $SFDR_5\approx$130 dB. The dynamic range for the linearized system is greater than the $SFDR_{3,3}\approx$113 dB of a conventional link over a bandwidth in excess of 1 GHz.

In addition, the bandwidth of the linearized link of FIG. 1 can be increased by using interferometers with shorter differential delays, which reduces the variation of γ, the magnitude of the ratio of effective halfwave voltages, with frequency. As discussed above, equation (9) defines the relationship between γ, the differential delays, and the frequency.

Figure 8:
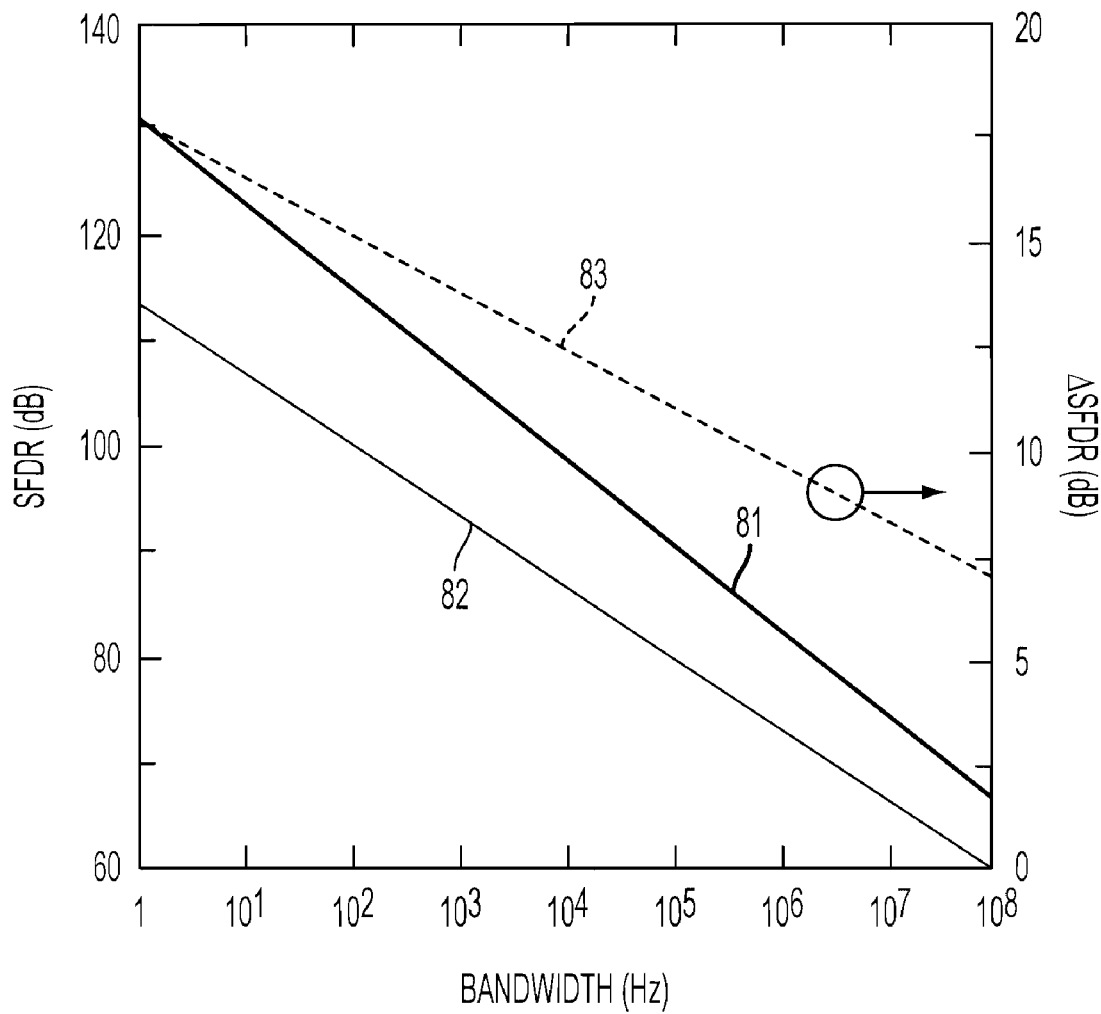
FIG. 8 shows the calculated dynamic range of the linearized link, a conventional phase modulated link, and the improvement in dynamic range for the linearized link.

For receivers, the link dynamic range depends heavily on the receiver measurement bandwidth. The common practice of specifying the dynamic range in a 1-Hz bandwidth is, therefore, useful for comparing system performance or linearization efficacy. For system implementation, it is more useful to examine the dynamic range across a range of bandwidths. FIG. 8 shows the calculated dynamic ranges of the linearized link 81 and a conventional ΦM link 82 versus receiver measurement bandwidth, and also shows the improvement in dynamic range 83 afforded by the linearized link architecture over a bandwidth range of 1 Hz to 100 MHz. Here, the total received photocurrent is $I_{dc,total}$=$I_{dc,1}$+$I_{dc,2}$=8.3 mA (the current levels for the linearized and conventional link data shown in FIG. 6). Since the increase in dynamic range arises from a change in degree of the in-band IMD component (i.e., quintic instead of cubic), the improvement in linearity is not constant with receiver (measurement) bandwidth. For a fixed photocurrent and noise power spectral density in a 1-Hz bandwidth, the improvement in dynamic range is (in dB)

$$\Delta SFDR \propto 10 \log(B_e^{-2/15}) \qquad (23)$$

for the linearized link. This is in contrast to a link with a suppressed (though dominant) cubic contribution to the IMD in which the improvement in dynamic range would remain constant as the receiver bandwidth is varied. As shown in FIG. 8, the improvement in dynamic range (ΔSFDR) decreases from ΔSFDR≈17 dB for a 1-Hz bandwidth, to ΔSFDR≈6 dB for a bandwidth of 100 MHz [ΔSFDR≈−11 dB from Equation (23) over 1 Hz to 100 MHz].

For a fixed set of interferometer delays ($\tau_1, \tau_2$) linearization can be achieved at any frequency where both individual links have non-zero RF gain. The interferometer time delays can be chosen to achieve a particular frequency (or frequency band) of operation, linearization bandwidth, or to keep the photocurrents at reasonable levels.

Example 2

As another example, the link 2 interferometer of Example 1 ($\tau_2$=375 ps) is replaced with a $\tau_2$=25 ps interferometer to increase the link bandwidth. As shown in FIG. 1, the phase shifter and 180 degree hybrid coupler are included in the receiver, enabling operation at a range including 5 GHz. The link 1 interferometer has a time delay $\tau_1$=100 ps, as in the previous example.

For this choice of interferometers, the linearization condition is $I_{dc,2}/I_{dc,1}$=16.8. Experimentally, linearized operation is achieved for photocurrents of $I_{dc,1}$=0.56 mA and $I_{dc,2}$=6.6 mA, which yields a photocurrent ratio of $(\alpha_2 I_{dc,2})/(\alpha_1 I_{dc,1})$= 1.63×11.86=15.15 (accounting for the relative RF response of the two links $\alpha_2/\alpha_1$=1.63).

Figure 9:
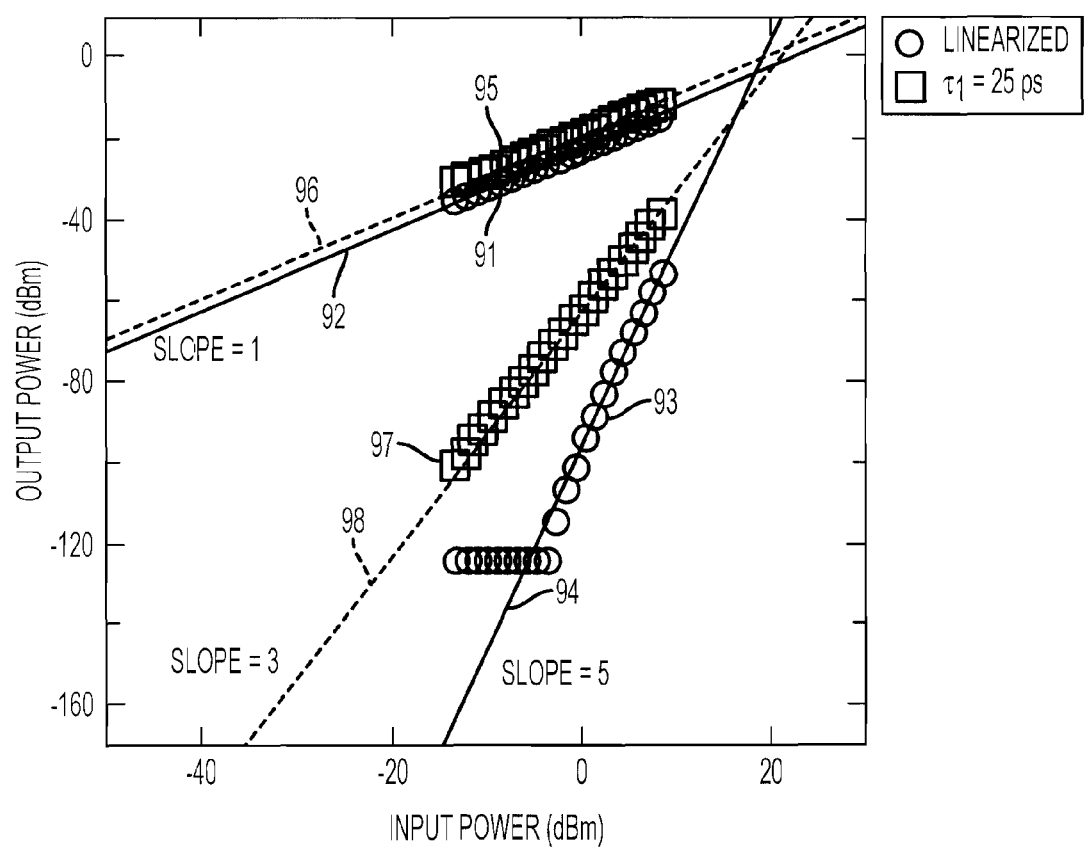
FIG. 9 shows the measured fundamental and intermodulation distortion responses of the FIG. 1 system with time delays $\tau_2$=25 ps and $\tau_1$=100 ps.

FIG. 9 shows the measured fundamental and intermodulation distortion responses as circles 91, 93 and the corresponding linear fit curves 92, 94 for the linearized link with $\tau_2$=25 ps and $\tau_1$=100 ps. The fundamental response linear fit curve 92 is shown having a slope of 1, and the intermodulation distortion linear fit curve 94 has a slope of 5. For comparison, the responses of a single link 2 ($\tau_2$=25 ps) are shown by squares 95, 97 and linear fit curves 96, 98 to the measured responses. The links are operated at a frequency of 5.1 GHz.

Note that the measured gain G=−22 for the linearized link with parallel AMZs ($\tau_1$=100 ps, $\tau_2$=25 ps) agrees very well with that predicted by Equation (15). The output fifth-order intercept point is measured to be $OIP_{3,5}$=−4 dBm, which agrees to within 1 dB with the value predicted by Equation (19) of $OIP_{3,5}$=−3 dBm. From Equation (18), the measured output intercept point and shot noise level of $N_o$=−143 dBm (Be=300 Hz) yield a quintic-limited dynamic range of ≈dB (extrapolated to Be=1 Hz) which is in excellent agreement with the ≈dB predicted by Equation (20). For comparison, the conventional link employing the 25 ps interferometer demonstrates a measured third-order-limited dynamic range of $SFDR_{3,3}$≈112 dB and a theoretical third-order-limited dynamic range of (113 dB, Be=1 Hz). Thus, the linearized link with parallel AMZs ($\tau_1$=100 ps, $\tau_2$=25 ps) shows an approximately 18 dB improvement over the single AMZ ($\tau_2$=25 ps) ΦM conventional link operating at approximately the same received photocurrent. Note that in this example, linearization is achieved for a photocurrent ratio that is about 10% lower than predicted by theory; this implies photodiode nonlinearities may significantly affect system performance.

Additional suppression terms can be suppressed by including additional parallel interferometers. To simultaneously suppress M distortion orders requires M+1 unique interferometers. For example, four interferometers could essentially remove the third-, fifth-, and seventh-order contributions to intermodulation distortion. In addition, the interferometers can be integrated into a single planar lightwave circuit.

Figure 10:
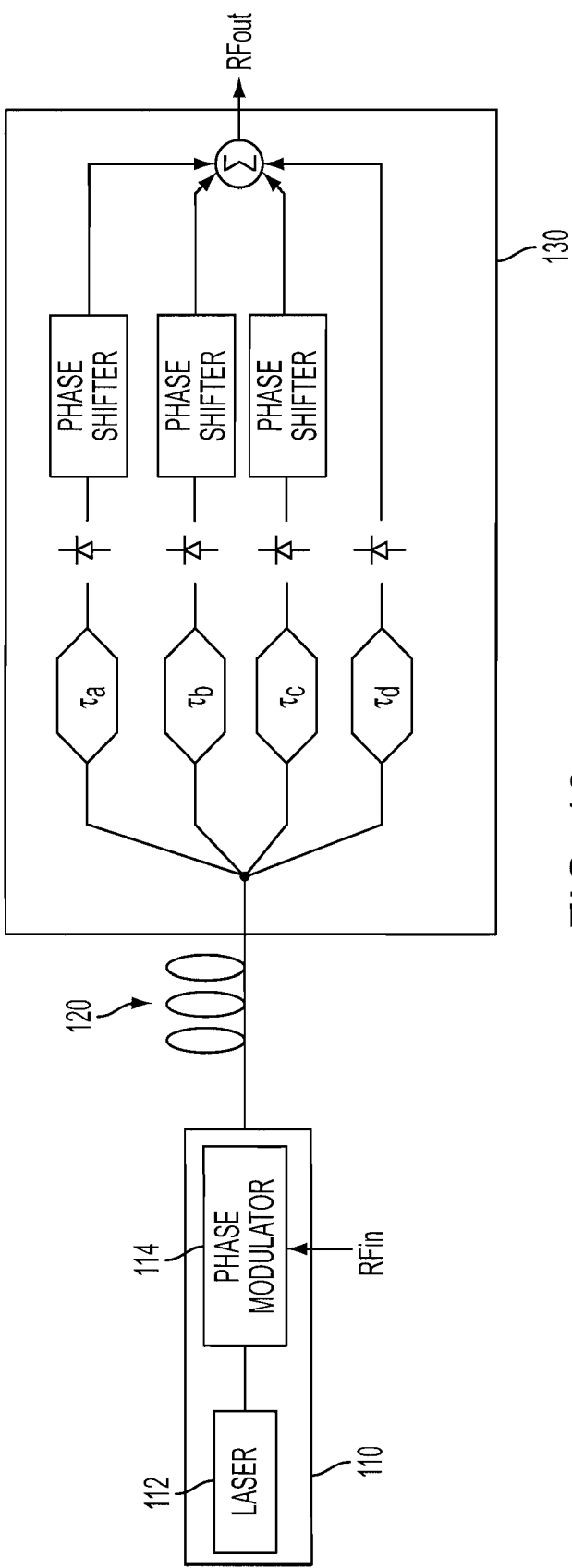
FIG. 10 shows a phase-modulated analog photonic link for reducing higher order intermodulation distortion.

FIG. 10 illustrates an an exemplary embodiment of a phase-modulated analog link with a receiver 130 adapted to remove the third, fifth, and seventh-order contributions to intermodulation distortion. The transmitter 110 has a laser 112 and a phase modulator 114 that phase modulates the optical carrier generated by the laser 110 with the RF input signal.

The receiver 130 includes four parallel optical paths, each having an asymmetrical interferometer that converts the phase modulated optical signal into an intensity modulated optical signal. The interferometers having unequal time delays such that $\tau_a \neq \tau_b \neq \tau_c \neq \tau_d$. Each optical path also has a photodiode that receives the intensity modulated optical power from the corresponding interferometer. The receiver also includes a summing device for summing the photocurrents. The summing device can be a four port power combiner or two stages of hybrid couplers, for example. Three of the four optical paths also include a phase shifter, to ensure that the input photocurrents to the summing device have the correct phase relationship.

The output of the summing device is the RF output signal, which is the recovered RF input signal to the transmitter's phase modulator.

Figure 11:
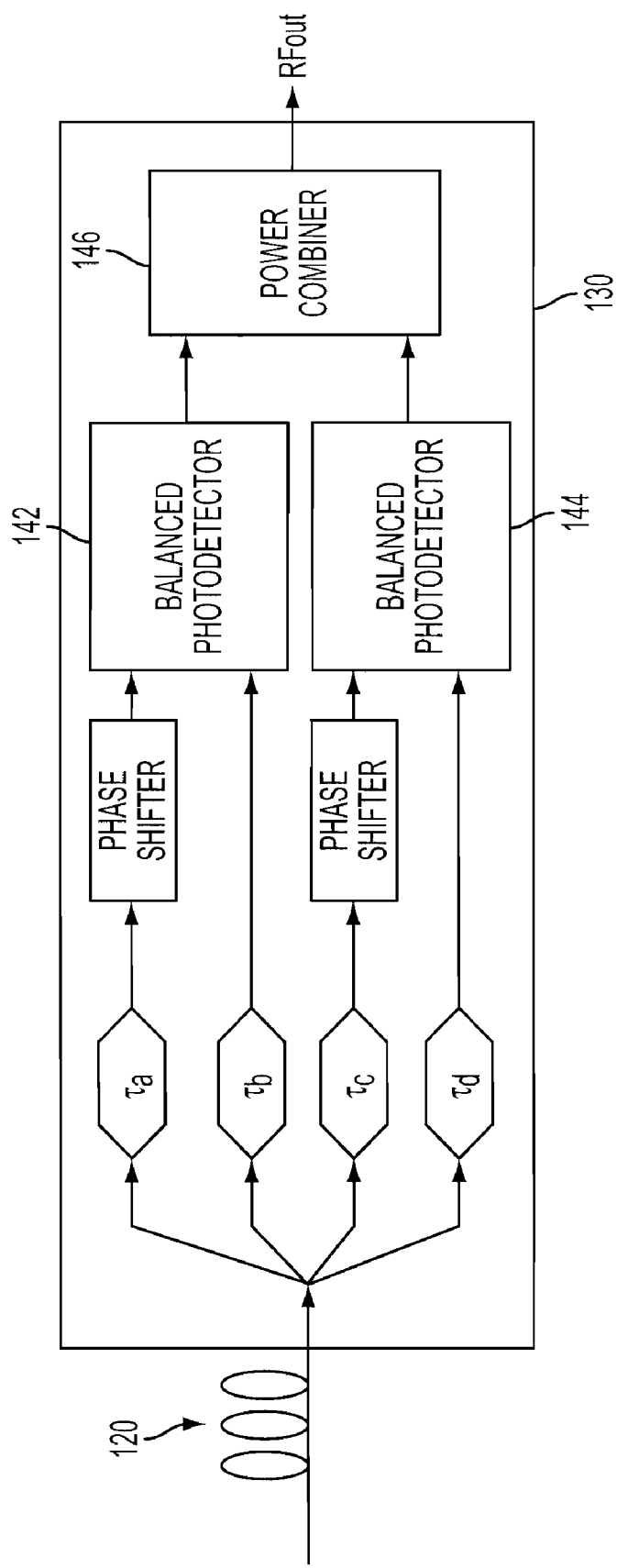
FIG. 11 shows a phase-modulated analog photonic link for reducing higher order intermodulation distortion.

Alternatively, the receiver can include two balanced detectors 142 and 144 and a power combiner 146 or hybrid coupler, as shown in FIG. 11.

Embodiments of the invention are directed to a novel phase-modulated analog optical link that uses parallel interferometric demodulation to mitigate the dominant intermodulation distortion present in the link. This technique offers up to nearly two orders-of magnitude improvement in dynamic range over conventional (phase- or intensity-modulated) analog links operating at the same received photocurrent levels. Embodiments of the invention also include radio-over-fiber and phased-array radar systems including the analog photonic links described herein. Embodiments of the invention are also directed to methods for suppressing intermodulation distortion in an analog optical link by using the phase modulated optical link techniques and devices described herein.

In the link architectures shown herein, linearization is achieved at the demodulator (receiver end) of the link. This link architecture addresses linearization problem at the receive end of the link and allows use of standard commercial phase modulators in the link front end. This simplicity makes the link useful for antenna remoting applications in harsh or hostile environments.

The invention has been described with reference to certain preferred embodiments. It will be understood, however, that the invention is not limited to the preferred embodiments discussed above, and that modification and variations are possible within the scope of the appended claims.

What is claimed as new and desired to be protected by Letters Patent of the United States is:

1. A phase modulated optical link, comprising:
a receiver for demodulating phase modulated analog optical signals the receiver including
a splitter arranged to split the phase modulated analog optical signals into a first optical path and into a parallel second optical path,
said first optical path having an asymmetrical interferometric demodulator and a first photodiode optically connected to an output of the first interferometric demodulator, and
said second optical path having a second asymmetrical interferometric demodulator and a second photodiode optically connected to an output of the second interferometric demodulator, the receiver utilizing the frequency dependence of the parallel first and second interferometric demodulators to suppress intermodulation distortion.

2. The link according to claim 1, wherein said first and second interferometric demodulators have unequal time delays.

3. The phase modulated optical link according to claim 2, wherein the difference in time delays in the parallel interferometric demodulators balances the third-order distortion in the output photocurrent and achieves a fifth-order limited link response.

4. The link according to claim 1, wherein said first photodiode and said second photodiode are components of a balanced photodetector pair.

5. A receiver for demodulating phase modulated analog optical signals, comprising:
   a splitter for splitting said phase modulated analog optical signals into a first and a second parallel optical paths;
   said first optical path having an asymmetrical interferometer with a first time delay, and a first photodiode optically connected to an output of the first interferometer;
   said second optical path having a second asymmetrical interferometer having a second time delay, and a second photodiode optically connected to an output of the second interferometer; and
   a 180 degree hybrid coupler arranged to receive the outputs of the first and the second photodiodes and to generate a demodulated signal, wherein said first time delay is not equal to said second time delay.

6. The receiver according to claim 5, wherein the first interferometer and the second interferometer are quadrature biased.

7. The receiver according to claim 5, further comprising:
   phase shift means in at least one of the optical paths arranged between the interferometer and the hybrid coupler, said phase shift means arranged to ensure the inputs to the hybrid coupler are 180 degrees out of phase.

8. The receiver according to claim 5, wherein the splitter directs more of the phase modulated analog optical power into the optical path having the interferometer with a shorter time delay.

9. The receiver according to claim 8, wherein the difference in time delays in the first interferometer and the second interferometer balances the third-order distortion in the output photocurrent and achieves a fifth-order limited link response.

10. The receiver according to claim 5, wherein a ratio of phase modulated analog optical power directed into the first optical path to power directed into the second optical path is $$\left|\frac{P_a}{P_b}\right| = |\sin(\omega\tau_b/2)/\sin(\omega\tau_a/2)|^{n+m} = \gamma^{n+m},$$

wherein n and m are integers and n+m is the odd order of intermodulation distortion to be suppressed, $P_a$ is the optical power into the first optical path, and wherein $P_b$ is the optical power into the second optical path, $\tau_a$ is the time delay of the first interferometer, and $\tau_b$ is the time delay of the second interferometer.

11. The receiver according to claim 5, wherein the ratio of the effective halfwave voltages of the first interferometer and the second interferometer is inversely proportional to the ratio of phase modulated optical power directed into the first optical path and the second optical path.

12. The receiver according to claim 5, wherein a ratio of DC photocurrents into the photodiodes is inversely proportional to the ratio of effective halfwave voltages in the interferometers.

13. The receiver according to claim 5 in combination with:
   a transmitter having a continuous wave laser and a phase modulator arranged to phase modulate the continuous wave laser with a suboptical frequency signal; and
   an optical fiber carrier carrying the phase modulated optical energy from the transmitter to the receiver,
   wherein said receiver demodulates said suboptical frequency signal.

14. A receiver for demodulating phase modulated analog optical signals, comprising:
   a splitter for splitting said phase modulated analog optical signals into a first and a second parallel optical paths at unequal power levels;
   said first optical path having an asymmetrical interferometer with a first time delay;
   said second optical path having a second asymmetrical interferometer having a second time delay; and
   a balanced photodetector including at least two photodiodes, a first of the two photodiodes arranged to receive the output of the first interferometer and the second of the two photodiodes arranged to receive the output of the second interferometer, the receiver demodulating the phase modulated analog optical signal, wherein said first time delay is not equal to said second time delay.

15. The receiver according to claim 14, wherein the first interferometer and the second interferometer are quadrature biased.

16. The receiver according to claim 14, further comprising:
   phase shift means in at least one of the optical paths arranged between the interferometer and the balanced photodetector, said phase shift means arranged to ensure the inputs to the balanced photodetector are 180 degrees out of phase.

17. The receiver according to claim 14, wherein the splitter directs more of the phase modulated analog optical signal power into the optical path with a shorter time delay.

18. The receiver according to claim 14, wherein the difference in time delays in the first interferometer and the second interferometer balances the third-order distortion in the output photocurrent and achieves a fifth-order limited link response.

19. The receiver according to claim 14, wherein a ratio of power directed into the first optical path to power directed into the second optical path by the splitter is $$\left|\frac{P_a}{P_b}\right| = |\sin(\omega\tau_b/2)/\sin(\omega\tau_a/2)|^{n+m} = \gamma^{n+m},$$

wherein n and m
   are integers and n+m is the odd order of intermodulation distortion to be suppressed, $P_a$ is the optical power into the first optical path, $P_b$ is the optical power into the second optical path, $\tau_a$ is the time delay of the first interferometer, and $\tau_b$ is the time delay of the second interferometer.

20. The receiver according to claim 14, wherein the ratio of the effective halfwave voltages of the first interferometer and the second interferometer is inversely proportional to the ratio of phase modulated optical power directed into the first optical path and the second optical path.

21. The receiver according to claim 14, wherein a ratio of DC photocurrents into the photodiodes is inversely proportional to the ratio of effective halfwave voltages in the interferometers.

22. The receiver according to claim 14 in combination with:
   a transmitter having a continuous wave laser and a phase modulator arranged to phase modulate the continuous wave laser with a suboptical frequency signal; and
   an optical fiber carrier carrying the phase modulated optical energy from the transmitter to the receiver,
   wherein said receiver demodulates said suboptical frequency signal.

* * * * *